United States Patent [19]

Manuel

[11] Patent Number: 5,738,043

[45] Date of Patent: Apr. 14, 1998

[54] SMALL ANIMAL CARRIER

[76] Inventor: Kathy Manuel, 1349 Emerald Dr., Crystal Beach, Tex. 77650

[21] Appl. No.: 572,735

[22] Filed: Dec. 14, 1995

[51] Int. Cl.⁶ ................................................. A01K 29/00
[52] U.S. Cl. ........................ 119/497; 119/792; 119/907
[58] Field of Search ........................... 119/496, 497, 119/607, 907, 792-3, 850, 856; 54/79.1, 79.2; D30/151; 224/580

[56] References Cited

U.S. PATENT DOCUMENTS

| | | | |
|---|---|---|---|
| D. 290,178 | 6/1987 | Nissen | 119/497 |
| 3,850,144 | 11/1974 | Springer et al. | 119/497 |
| 4,137,870 | 2/1979 | Cano | 119/850 |
| 4,334,601 | 6/1982 | Davis | 224/580 |
| 4,355,600 | 10/1982 | Zielinski | 119/850 |
| 4,530,309 | 7/1985 | Collins | 119/907 |
| 4,977,857 | 12/1990 | Slawinski | 119/497 |
| 5,193,486 | 3/1993 | Kitchens | 119/856 |
| 5,531,187 | 7/1996 | Ward | 119/856 |

*Primary Examiner*—John G. Weiss
*Assistant Examiner*—Bruce E. Snow
*Attorney, Agent, or Firm*—Michael P. Breston

[57] ABSTRACT

The small animal carrier comprises left and right side panels, and a bottom panel defining therebetween a neck opening, a tail opening, a pair of unrestrained lateral front leg openings, and a pair of lateral unrestrained rear leg openings symmetrically positioned on both sides of the bottom panel. A pair of opposite handles extend outwardly and upwardly from the mid sections of the left and right side panels for hand carrying the animal. Detachable closure means are provided on the longitudinal edges of the side panels to serve as a leash and as a shoulder strap.

2 Claims, 3 Drawing Sheets

SMALL ANIMAL CARRIER

BACKGROUND OF THE INVENTION

1. Field of the Invention

This invention relates to small animal carriers such as dogs, and particularly concerns such carriers that are multifunctional and which can easily receive the animal therein.

2. Description of the Prior Art

Animal carriers especially for small dogs are very popular, but most of the ones that are known to me are awkward and uncomfortable both for the dog and for its handler.

For example, in some dog carriers, the front and rear legs are restrained within pockets having closed bottoms. Others have no shoulder strap or tail hole. Some carriers do have leg holes but are difficult to use, or the dog is not comfortable in them because of pressure points or skin irritation to the dog.

More irritating is the fact that with the known dog carriers it is rather difficult and awkward to maintain the dog's body at a desired position. This is especially troublesome while the handler is running, bending, etc.

Also, the stiffness of some such dog carriers has proved to be an impediment to their use because they can contribute to early fatigue of and skin irritation to the dog's handler.

In general, the known-type dog carriers have one or more of the following drawbacks: they are cumbersome to use, too expensive to make, are not universal in the sense that they are designed to accommodate a particularly-shaped dog, are fragile, and are relatively difficult to place over the dog and maintain it in the placed position.

Accordingly, it is a main object of this invention to overcome the above-mentioned and other known drawbacks of prior dog carriers.

It is a further object to provide a small dog carrier which is simple, practical, lightweight, easy to wash, easily deformable, easy to slip on and off, stores nearly flat, comfortable for the animal, designed for minimum interference with user, can be carried with handles or with shoulder strap, can be converted to a leash, is safer and easier to use both for the dog and its handler, is economical to manufacture, does not require complicated mechanical fasteners, and easily adapts itself to a dog's particular anatomy within its weight category.

SUMMARY OF THE INVENTION

The small animal carrier comprises left and right side panels and a bottom panel defining therebetween a neck opening, a tail opening, a pair of unrestrained lateral front leg openings, and a pair of unrestrained lateral rear leg openings, all symmetrically positioned on both sides of the bottom panel.

For carrying the animal by hand, a pair of opposed handles extend outwardly and upwardly from the middle sections of the left and right side panels.

Preferably, forward detachable fastener means are coupled to the forward corners of the side panels for closing the neck opening around the animal's neck. The forward fastener means include one pair of rings and one end of a strap which hooks the rings, the rest of the strap can serve as a leash for guiding the animal. The opposite strap's end can hook another pair of rings coupled to the opposite panel corners, thereby allowing the strap to serve as a shoulder strap.

DESCRIPTION OF PREFERRED EMBODIMENTS

Figure 1:
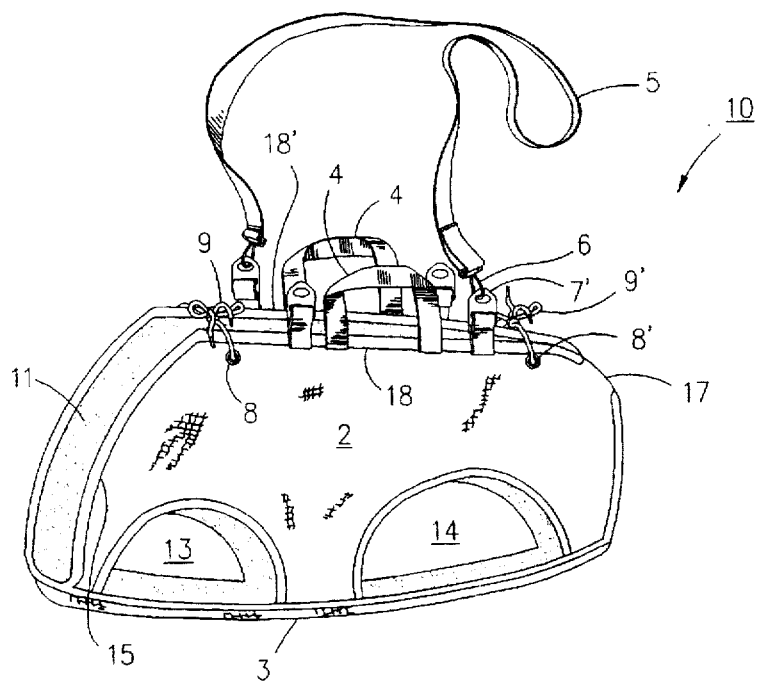
FIG. 1 is a right-side, elevational view of the carrier.
Figure 2:
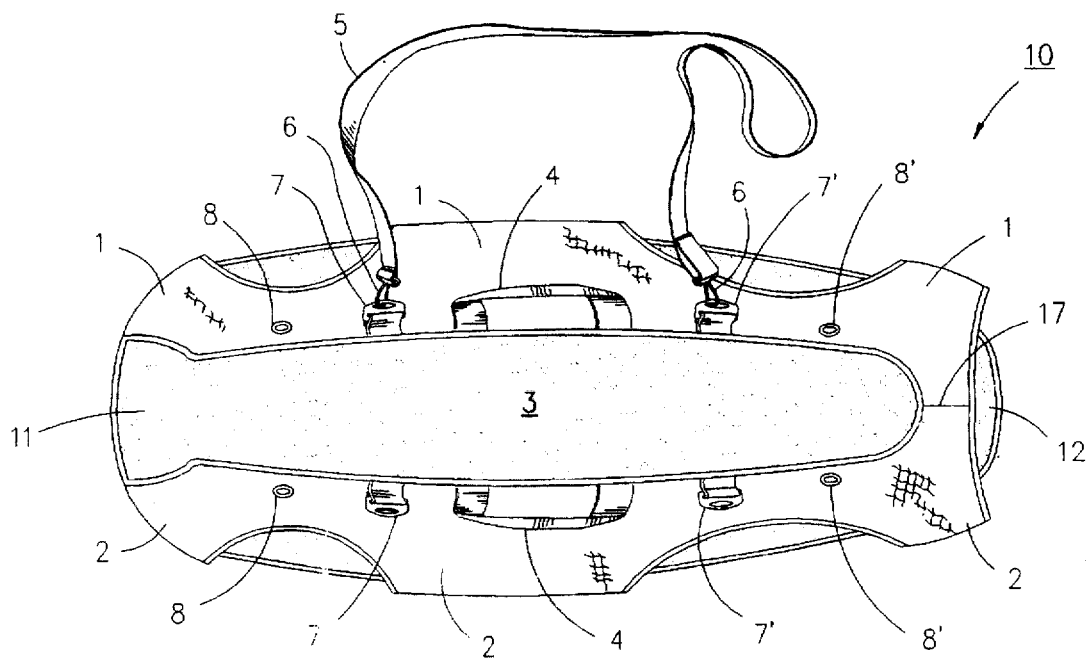
FIG. 2 is a top plan view of the carrier.

The dog carrier 10 comprises a left side panel 1, a right side panel 2, and a bottom panel 3. Preferably, each panel has two back-to-back sheets of different color materials. The interior and exterior sheets are reversible without affecting the functionality of the carrier.

The left and right side panels 1 and 2 and the bottom panel 3 define therebetween a neck opening 11, a tail opening 12, a pair of unrestrained lateral front leg openings 13, and a pair of lateral unrestrained rear leg openings 14, all symmetrically positioned on both sides of bottom panel 3.

Preferably, detachable fastener means are coupled to the neck side panel corners for (1) closing neck opening 11 around the animal's neck and for (2) guiding it on a leash. They include a pair of forward rings 7, such as D-rings, coupled to the neck side corners. A strap 5 hooks rings 7 either directly or with a snap hook 6. The remainder of the strap 5 can serve as a collarless leash. Thus, the pet can be walked around while being restrained by the combined actions of panels 1–3 and of strap 5.

The detachable fastener means preferably also include a pair of rear rings 7' coupled to the side panel tail corners. The free end of strap 5 can hook rings 7' either directly or with a snap hook 6. When both of the strap's ends are hooked, the dog can be shoulder carried thereon. The D-rings 7, 7' detachably receive the snap hooks 6 on the opposite ends of flat strap 5.

A pair of opposite handles 4 extend outwardly and upwardly from the mid sections of the left and right longitudinal edges 18', 18 of side panels 1 and 2 for hand carrying the animal.

Two pairs of mating eyelets 8, 8' are also provided below the front and rear panel corners for respectively accepting tie closures 9, 9' which can in and by themselves suspend carrier 10 on the dog's back.

On the other hand, when both pairs of rings 7, 7' are hooked by snap hooks 6 they also can in and by themselves suspend carrier 10 on the dog's back.

The panels 1–3 are made of a lightweight, readily deformable material which conforms easily to the dog's body, and which is easy to wash and comfortable for the dog.

The handles 4 and strap 5 are preferably made of a flat, flexible, readily deformable material to match the shape of the animal's body and not to irritate the skin of the dog nor of its handler when using the handles, the shoulder strap, or the leash.

All openings and holes can be easily and economically done with a cutting die in a single stamping operation.

Figure 4:
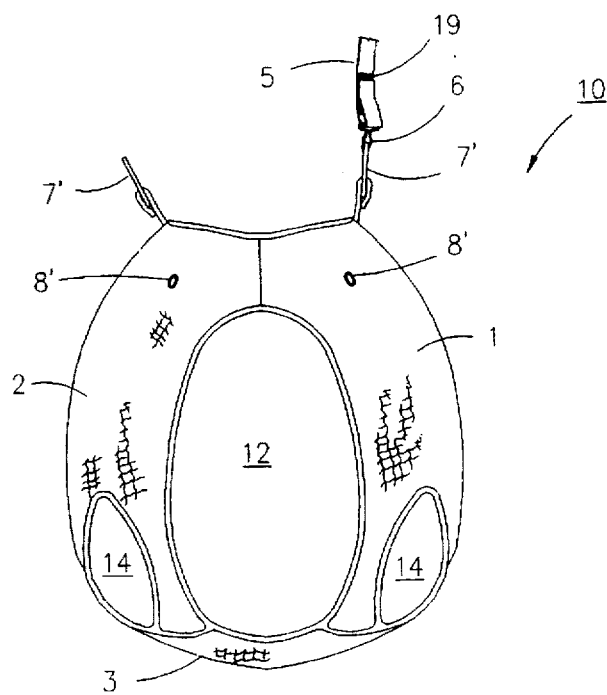
FIG. 4 is a rear elevational view thereof.
Figure 5:
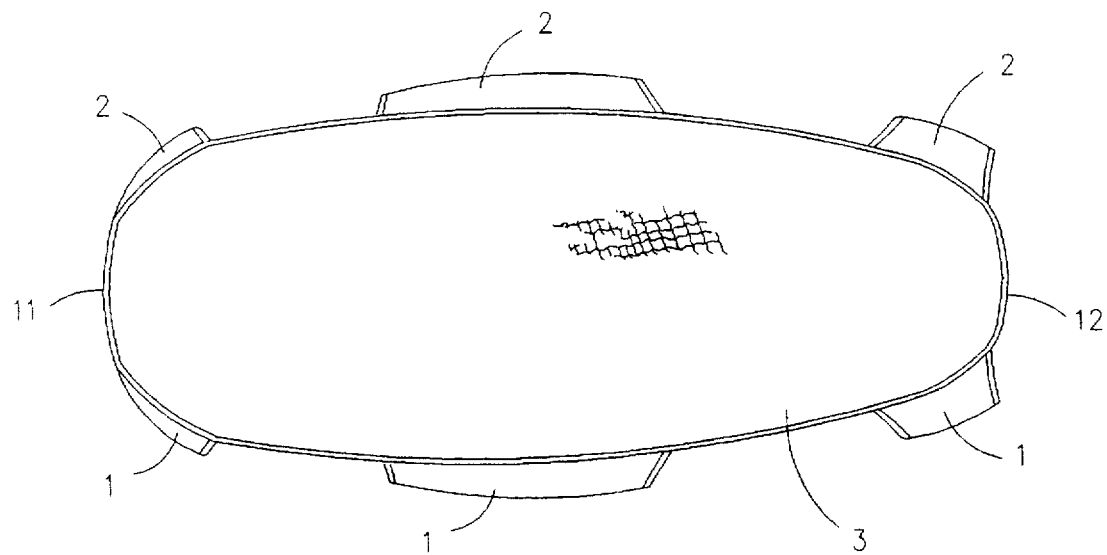
FIG. 5 is a bottom plan view thereof.
Figure 6:
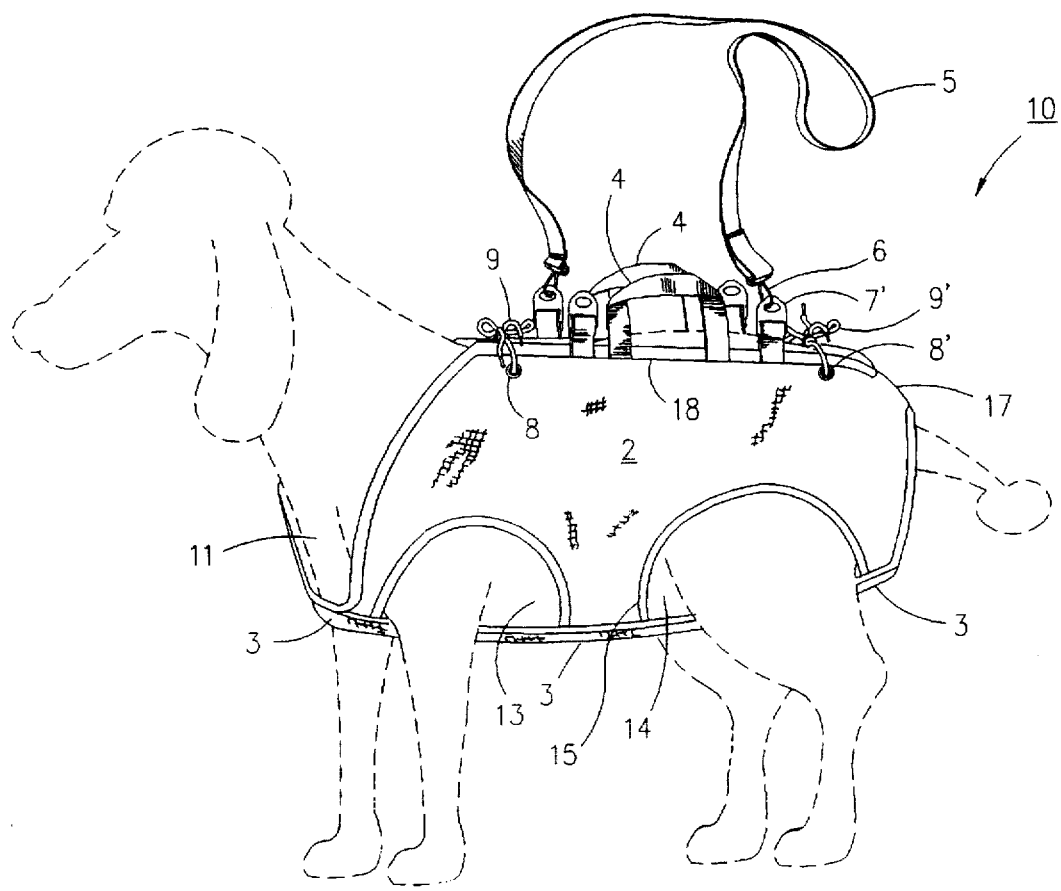
FIG. 6 is perspective view from the right side showing the carrier on the dog.

While the tail corners of the side panels can stay open, preferably, they are stitched together as shown at 17 in FIG. 4. In that case, eyelets 8' would not be needed except for symmetry of appearance.

All outer and inner edges are preferably stitched together with a ribbon 15 for added strength and appearance.

The pair of opposed carry handles 4 are stitched to the left and right panels 1 and 2.

The front and rear D-rings 7, 7' are stitched to the corners of side panels 1 and 2 on the opposite sides of handles 4.

Figure 3:
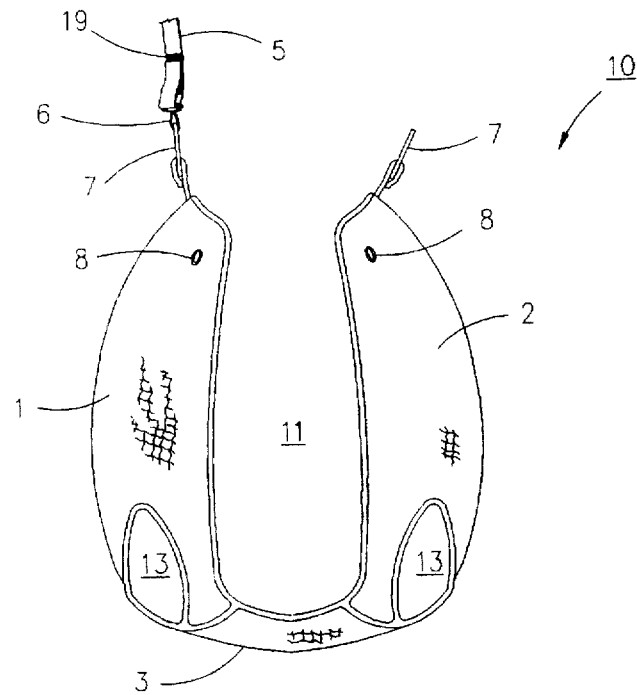
FIG. 3 is a front elevational view thereof.

The strap 5 can be provided with one or two conventional complementary pairs of spaced apart fastener strips 19 as shown in FIGS. 3 and 4, one having woven hooks and the other strip carrying woven loops which mechanically interlock by applying pressure to one of the strips, whereby the loop strips become detachably fastened to the hook strips in any position pressed together. The rear end of the shoulder strap 5 would loop back on itself around its mating D-rings 7', carrying hooks 6, thereby allowing the length of the strap to be adjustable.

In use, the dog's tail is passed through the tail opening 12 and the opposite side panels 1 and 2 are raised up towards its back. The dog is then ready to be lifted up above ground and hand carried, or shoulder carried to relieve hand fatigue which is a valuable convenience. The dog is suspended from the shoulder by the mechanical interaction between snap hooks 6 and D-rings 7, 7'.

In accordance with an important aspect of this invention, when rear snap hook 6 of shoulder strap 5 is unfastened from rear D-rings 7', strap 5 can serve as a leash to guide the dog while it continuous to wear its carrier 10.

The carrier 10 falls off from the dog when neck tie closure 9 is untied and/or neck snap hook 6 is detached from forward D-rings 7. Once removed, carrier 10 becomes substantially flat and is ready for storage or reuse without any prior preparation.

As will be apparent, the carrier is of unitary construction and therefore offers economy and flexibility for mass fabrication.

It will be appreciated that the objects set forth above have been accomplished, while other advantages and modifications will readily become apparent to those skilled in the art.

What I claim is:

1. A multi-functional pet carrier capable of serving (1) as a wearable garment for a very small four-legged pet, (2) as a carrier for carrying it around, and (3) as a collarless pet leash for walking and restraining the pet said carrier comprising:

(1) a body portion made of a flexible material defining a bottom belly panel and a pair of left and right side opposite panels extending from and being unitary with opposite longitudinal edges of said belly panel, each side panel having a longitudinal edge, front and rear side edges, and a pair of longitudinally spaced cutouts for accepting the pet's front and hind legs therethrough, and (2) releasable, longitudinally-spaced, connecting means having front and rear portions thereof on said opposite longitudinal edges of said left and right side panels; and said garment, in use, being drawn up to said pet from below, with its legs protruding freely through said cutouts, and with said opposite longitudinal edges being releasably joined together in opposing relation near to said pet's back, so that its neck can freely extend through a front opening formed between said joined opposite front side edges of said panels, and its tail can freely extend through a rear opening between said rear side edges of said panels, thereby allowing said garment wearing pet to run around freely and unrestricted in the movements of its neck, legs, and tail; and an elongated multi-functional strap means having front and rear portions thereof releasably attached to said front and rear portions of said connecting means, respectively, thereby converting said garment into said carrier for supporting and carrying said pet around in a natural position on said strap means from the shoulder of its handler, while said pet's front and hind legs remain substantially equidistant from the ground free to move externally of said garment, and when said rear portion of said strap means is released from said rear portion of said connecting means, said carrier converts into said collarless pet leash for walking and restraining said pet with said released rear portion of said strap means.

2. The multi-functional pet carrier according to claim 1, and a pair of handles attached to the mid-sections of said panels' longitudinal edges for supporting and carrying said pet around with said handles in a natural position, while its front and hind legs remain substantially equidistant from the ground free to move externally of said garment.

* * * * *